(12) United States Patent
Vangen et al.

(10) Patent No.: US 12,322,938 B2
(45) Date of Patent: Jun. 3, 2025

(54) ROPE ROBOT AND METHOD FOR MOUNTING AN OBJECT TO A POWER LINE

(71) Applicant: Comrod AS, Tau (NO)

(72) Inventors: Knut Vangen, Sandvika (NO); Velid Omerovic, Jørpeland (NO)

(73) Assignee: Comrod AS, Tau (NO)

( * ) Notice: Subject to any disclaimer, the term of this patent is extended or adjusted under 35 U.S.C. 154(b) by 286 days.

(21) Appl. No.: 17/775,147

(22) PCT Filed: Nov. 26, 2020

(86) PCT No.: PCT/NO2020/050290
§ 371 (c)(1),
(2) Date: May 6, 2022

(87) PCT Pub. No.: WO2021/107784
PCT Pub. Date: Jun. 3, 2021

(65) Prior Publication Data
US 2022/0385047 A1    Dec. 1, 2022

(30) Foreign Application Priority Data

Nov. 27, 2019 (NO) .................................. 20191411

(51) Int. Cl.
*H02G 1/04* (2006.01)
*B25J 5/02* (2006.01)
*B62D 57/024* (2006.01)

(52) U.S. Cl.
CPC .................. *H02G 1/04* (2013.01); *B25J 5/02* (2013.01); *B62D 57/024* (2013.01)

(58) Field of Classification Search
CPC .............. H02G 1/04; B25J 5/02; B62D 7/024
See application file for complete search history.

(56) References Cited

U.S. PATENT DOCUMENTS 1,976,378 A    10/1934    Vrooman
2,030,491 A    2/1936    Abadie
(Continued)

FOREIGN PATENT DOCUMENTS

CA        2108178        10/1992
CN        204012935 U    12/2014
(Continued)

OTHER PUBLICATIONS

Norwegian Search Report for No. 20191411, dated Mar. 24, 2020.
International Search Report and the Written Opinion for PCT/NO2020/050290, dated Mar. 9, 2021.
(Continued)

*Primary Examiner* — Seahee Hong
(74) *Attorney, Agent, or Firm* — Andrus Intellectual Property Law, LLP

(57) ABSTRACT

A method is for mounting an object, such as a line sensor, to a power line. The method includes: i) suspending and tensioning at least two ropes between a physical ground and a power line; ii) coupling a rope robot with the at least two ropes in such a way that the rope robot can climb up and down the at least two ropes in operational use; iii) providing an object on the rope robot; iv) making the rope robot climb up to the power line to bring the object close to the power line; v) mounting the object to the power line with the rope robot, and vi) decoupling the rope robot from the object and making the rope robot climb down the at least two ropes. A rope robot is disclosed for carrying out this method.

20 Claims, 9 Drawing Sheets

(56) References Cited

U.S. PATENT DOCUMENTS

| | | | |
|---|---|---|---|
| 3,124,712 A | | 3/1964 | Alexander |
| 4,014,516 A * | | 3/1977 | Jacks ................. H02G 1/04 |
| | | | 254/134.5 |
| 4,808,917 A | | 2/1989 | Fernandes |
| 4,839,567 A | | 6/1989 | Milton |
| 4,886,980 A | | 12/1989 | Fernandes |
| 4,993,913 A * | | 2/1991 | Ohtsuki ................. B25J 5/00 |
| | | | 901/41 |
| 5,203,646 A * | | 4/1993 | Landsberger ........... B08B 9/049 |
| | | | 901/44 |
| 6,315,269 B1 * | | 11/2001 | Fleury ................. H02G 1/04 |
| | | | 254/134.3 R |
| 6,540,207 B1 * | | 4/2003 | Barnes ................. H02G 1/04 |
| | | | 254/134.3 R |
| 6,677,743 B1 | | 1/2004 | Coolidge |
| 8,160,825 B1 | | 4/2012 | Roe, Jr. |
| 8,282,080 B2 * | | 10/2012 | Ballard ................. H02G 3/30 |
| | | | 254/134.3 R |
| 9,568,512 B2 | | 2/2017 | Divan |
| 11,006,297 B2 | | 5/2021 | Higgins |
| 11,499,994 B2 | | 11/2022 | Adachi |
| 11,781,698 B2 * | | 10/2023 | Fekrmandi ........... B62D 57/032 |
| | | | 180/8.6 |
| 2008/0024321 A1 | | 1/2008 | Polk |
| 2011/0288777 A1 | | 11/2011 | Gupta |
| 2012/0278011 A1 | | 11/2012 | Lancaster |
| 2013/0064178 A1 | | 3/2013 | Cs |
| 2013/0187636 A1 | | 7/2013 | Kast et al. |
| 2015/0022376 A1 | | 1/2015 | Zhang |
| 2015/0303663 A1 * | | 10/2015 | Wall ................. B61B 7/06 |
| | | | 105/49 |
| 2015/0331017 A1 | | 11/2015 | Raghunathan |
| 2016/0061862 A1 | | 3/2016 | Nulty |
| 2017/0227596 A1 | | 8/2017 | Sozer |
| 2020/0049743 A1 | | 2/2020 | Keister |
| 2020/0072814 A1 | | 3/2020 | Bailey |

FOREIGN PATENT DOCUMENTS

| | | |
|---|---|---|
| CN | 106786139 | 5/2017 |
| CN | 207053058 | 2/2018 |
| CN | 106992469 | 8/2018 |
| CN | 106312998 | 11/2019 |
| DE | 102020214614 B3 | 5/2021 |
| EP | 1001271 A1 | 5/2000 |
| NO | 20191123 | 3/2021 |
| WO | 2013123055 A1 | 8/2013 |
| WO | 2019161088 A1 | 8/2019 |
| WO | 2019171231 | 9/2019 |
| WO | 2020021802 A1 | 1/2020 |
| WO | 2020035179 A1 | 2/2020 |
| WO | 2021054841 A1 | 3/2021 |

OTHER PUBLICATIONS

Search Report for Norwegian Patent Application No. 20220762, dated Dec. 5, 2022.
International Search Report and the Written Opinion for PCT/NO2023/050089, dated Sep. 4, 2023.
Response to the Written Opinion for PCT/NO2023/050089, dated Mar. 8, 2024.
PCT Notice for PCT/NO2023/050089, dated Oct. 1, 2024.
Response to Notice for PCT/NO2023/050089, dated Oct. 14, 2024.
International Preliminary Report on Patentability for for PCT/NO2023/050089, dated Oct. 29, 2024.
Norwegian Search Report for NO 20191123, dated Feb. 24, 2020.
International Search Report and Written Opinion for PCT/No. 2020/050239, dated Dec. 14, 2020.
Response to the Written Opinion for PCT/NO2020/050239, dated Jul. 6, 2021.
International Preliminary Report on Patentability for PCT/NO2020/050239, dated Aug. 16, 2021.
Peek's Law, found online via https://en.wikipedia.org/wiki/Peek% 27s_law. Date Accessed: Dec. 10, 2024.
E. Kuffel, et al., High Voltage Engineering, Fundamentals, Second Edition, Pergamon Press 1984. p. 348.

* cited by examiner

ROPE ROBOT AND METHOD FOR MOUNTING AN OBJECT TO A POWER LINE

CROSS-REFERENCE TO RELATED APPLICATIONS

This application is the U.S. national stage application of International Application PCT/NO2020/050290, filed Nov. 26, 2020, which international application was published on Jun. 3, 2021, as International Publication WO 2021/107784 in the English language. The International Application claims priority of Norwegian Patent Application No. 20191411, filed Nov. 27, 2019. The international application and Norwegian application are both incorporated herein by reference, in entirety.

FIELD OF THE INVENTION

The invention relates to a method for mounting an object, such as a line sensor, to a power line. The invention also relates to a rope robot, which can carry out this method.

BACKGROUND OF THE INVENTION

Power distribution networks carrying power lines on mast constructions are found all over the world. In particular, where these power lines are crossing rough or difficultly accessible areas, it can be challenging to monitor the state of these power lines. Personnel may have to be sent on time-consuming, difficult and even dangerous hiking missions to inspect the network or fix problems like trees that have fallen on the lines, causing all kinds of problems like sparkover, breakage of power lines, etc. In order to solve these problems and challenges monitoring systems and line sensors have been reported in the prior art to provide for remote monitoring capability of power line networks.

Non-prepublished patent application NO20191123, owned by the same applicant, discloses a system for monitoring a power distribution network, wherein the power distribution network comprises a plurality of mast constructions placed on a ground at certain distances from each other and carrying at least one power line mounted to said mast constructions. The system comprises at least two smart modules, each smart module being affixed directly to a respective one of the plurality of mast constructions. The at least two smart modules are designed for wireless communication with each other in accordance with a wireless communication protocol for forming a main wireless communication network along the power line. The system further comprises at least one sensor system affixed directly to a respective one of said mast constructions, the at least one sensor system being designed for determining at least one quantity or event of the power distribution network and for communicating said at least one quantity or event to a respective smart module. The at least two smart modules are designed for communicating information associated with said at least one quantity or event along the main wireless communication network for being remotely monitored.

Even though the main system NO20191123 no longer needs line sensors to operate, it may still be supplemented with line sensors that are mounted directly to the power lines, as also some of the embodiments of NO20191123 clearly describe.

The mounting of line sensors to the power lines is generally a serious challenge. As far as sensor systems are to be placed inside the safety and security distance as defined in the EN50110-1 standard for regional power networks, they will have to be mounted using Live-line work processes (Norwegian: "Arbeid Under Spenning (AUS)") or when the power lines are switched off. The latter is often not preferred, which results in Live-line work processes being the only option. For more economic operation, including faster and timelier preventive and corrective actions at live overhead power lines, the utility companies and owners desire more or less continuous reception of live condition data from the power lines.

A sensor equipment has been developed which most frequently is installed at a power line and that at least measures one or more electrical or mechanical properties of the power line wire. Many of the available solutions are in addition to sending information also arranged for being able to communicate a position and accurate time of events, and thereby report where and when a failure has occurred or is about to occur.

Available line sensors are often arranged in such a way that their housing encloses the power line wire, requiring installation at the power line wire by a field worker located at or near the power line wire. Such actions may require that the power line wire is disconnected or powered off which is expensive for the utility owner. Therefore, field workers use methods for actions at high voltage potential, so-called live-line work. The distance method including hot stick and live line tools is most popular as the field worker stays safely at ground level. In this group of methods, staying on physical ground is the safest as work at height is avoided. Bare-hand methods or various insulating-glove-or-suit methods for live-line work are riskier, time consuming and expensive. Another disadvantage of the existing sensor housings enclosing the power line is that these sensor housings locally prevent cooling of the power line and hence create hotspots at the powerline. Furthermore, these sensors housings make visual inspection of the wire itself impossible, especially when it comes down to the wearing effects caused by the housing to the power line.

In view of the above-described problems there is a clear need to further develop line sensor mounting technology.

SUMMARY OF THE INVENTION

The invention has for its object to remedy or to reduce at least one of the drawbacks of the prior art, or at least provide a useful alternative to prior art.

The object is achieved through features specified in the description below and in the claims that follow.

In a first aspect the invention relates to a rope robot for climbing along at least two ropes that are substantially vertically suspended and tensioned between a physical ground and a power line of a power distribution network and for mounting an object, such as a line sensor, to the power line. The rope robot comprises:
  a rope robot housing;
  a crawler unit mounted on or in the rope robot housing for receiving and clamping onto the at least two ropes and for climbing up and down the at least two ropes in operational use;
  a rope climbing motor coupled to crawler unit for driving the crawler unit;
  a support unit provided at an upper side of the rope robot housing of the rope robot, the support unit being configured for holding the object, wherein the upper side is defined as the side of the rope robot housing facing up when the at least two ropes are oriented substantially vertically in operational use with the rope robot being coupled to it, and a manipulator unit configured for manipulating the object for mounting the object to the power line when within reach.

The effects of the features of the rope robot in accordance with the invention are as follows. A first remark to be made is that a rope robot for mounting a line sensor (or another object) to a power line has not been reported before. This mounting of the line sensor (or another object) is done by means of a combination of first climbing up the ropes with the object and then manipulating the object when the power line has been reached. The crawler unit may also be used during the manipulating and subsequent mounting of the object to the power line, i.e. to create extra pressure during installation of the object or a pulling force during removal of the object.

A first main feature is that the rope robot is configured for receiving and clamping onto the at least two tensioned ropes (without access to rope ends). With the ropes being fixed and suspended between the physical ground and the power line, this means that the rope robot's orientation relative to the power line is properly determined. Using two ropes substantially vertically suspended and tensioned between the physical ground and the power line, wherein the robot climbs in these two ropes, already provides for a self-aligning effect of the object relative to the power line. This is an important feature when it comes to mounting the object (such as a line sensor) to the power line.

A second main feature is that the rope robot is configured for receiving and holding the object to be mounted, when climbing towards the power line. Together with the first feature this means that the object also has a determined orientation relative to the power line.

A third main feature is that the rope robot is configured for climbing up and down the at least two ropes (which are generally substantially vertically suspended and tensioned), using a crawler unit that is driven by a rope climbing motor. This implies that no person needs to climb up to the power line, which results in a much safer situation for the person carrying out maintenance or installation on power distribution networks. Particularly in live-line operations, both in terms of risk for electric shock and in terms of falling from great heights.

A fourth main feature is that the rope robot is provided with a manipulator unit, which is configured for manipulating the object for mounting the object to the power line. It goes without saying that the object needs to be prepared for being mountable to the power line also. It is mentioned already at this stage that the manipulator unit has to be in tune with the object itself as to how it has been prepared and configured for being mounted to the power line. Expressed differently the functionality allowing the rope robot to mount said object to the power line has to be distributed over both parts of this assembly. This will be elaborated upon in more detail in the detailed description.

A fifth main feature is that the ropes are tensioned before the robot is attached. This causes the operation to be stable in wind conditions. In addition, the operation is independent from gravity (not vertical, but more diagonal). Neither do the ropes need to be exactly vertically suspended and tensioned. It also allows the robot climb friction and balance to be independent of rope flexibility and tension, which permits the tension and friction to be independently adjustable.

In order to facilitate understanding of the invention one or more expressions are further defined hereinafter.

Wherever the word "power line" is used, this must be interpreted as the conductor that is suspended between the masts and pylons of a power distribution network. Some may refer to such conductors as power line wire or a utility power line wire. This includes both high-voltage and low-voltage power line wires.

In an embodiment of the rope robot in accordance with the invention the crawler unit comprises at least two sets of wheels configured in such a way that one rope is clamped in between each pair of wheels, and wherein at least one of said wheels of each pair is driven by the rope climbing motor. A crawler unit in accordance with this embodiment provides for a very convenient way of crawling up and down the two ropes that are suspended between ground and a power line. Each pair of wheels clamps one of said ropes on two opposite sides and climbing is allowed by driving at least one of said wheels by the rope climbing motor.

In an embodiment of the rope robot in accordance with the invention the crawler unit comprises a wheel shaft between said wheels that are driven, which wheel shaft is driven by the rope climbing motor via a bevel gear that is rotatably coupled with the wheel shaft.

The driven wheels of each pair of wheels may be driven by the same rope climbing motor as this embodiment allows.

In an embodiment of the rope robot in accordance with the invention the support unit is configured and shaped for receiving the object in a confined manner or is configured and shaped for gripping and holding the object (i.e. a line sensor). The support unit in accordance with the invention is configured for holding the line sensor in place, when the rope robot is climbing up to the power line in operational use. The support unit on the rope robot is designed such that the line sensor cannot slide on the rope robot, which means that it is contained in a confined manner. The term "confined manner" is to be interpreted as that the line sensor is at least contained in the plane parallel to the upper side of the rope robot onto which the support unit is provided, that is the line sensor is prevented sliding within this plane. This may be achieved by means of specially formed arms on the rope robot, which support both the underside of the line sensor as well as provide an edge against which the side of the line sensor rests. The substantially vertically tensioned ropes will also contribute to horizontal confinement of the object. This may be done in many different ways. One example is explained in further detail in the detailed description.

In an embodiment of the rope robot in accordance with the invention the manipulator unit comprises a manipulation motor coupled to and driving a shaft coupling, wherein the manipulation motor and shaft coupling are placed in the rope robot housing in such a way that the shaft coupling sticks out at the upper side of the rope robot for allowing the object to be connected to shaft coupling and driven by the manipulation motor. This embodiment forms a very convenient way of allowing the rope robot to manipulate the object (line sensor), which has been prepared and configured for mounting to the power line. As the rope robot is climbing up with the object (line sensor) being provided on the upper side thereof, it is very convenient to have the shaft coupling sticking out on the same side of the rope robot, to allow it to be coupled with the object (which has to be designed in accordance with the features of the rope robot).

In a second aspect the invention relates to an object (such as a line sensor) for being mounted to a power line, the object being configured for being received by the rope robot in accordance with embodiments disclosed herein, the object being configured for being coupled to the manipulator unit when the object is received by the support unit of the rope robot in operational use, the object being further provided with an attachment mechanism on an upper side of the object and being configured for being mounted to the power line by the manipulator unit, wherein the upper side is defined as the side of the object facing up when the at least two tensioned ropes are oriented substantially vertically in operational use with the rope robot with the object being coupled to it.

In an embodiment of the object in accordance with the invention the attachment mechanism comprises a rotatable arm, which is configured for hooking to the power line by rotation of the rotatable arm. This embodiment realizes a first convenient and effective manner of mounting the object to the power line. When the rope robot has brought the power line within reach of the object, all that is needed is to rotate the rotatable arm such that the object is hooked to the power line, thereby mounting the object to the power line.

An embodiment of the object in accordance with the invention further comprises a locking mechanism for locking the rotatable arm after it has been hooked to the power line in operational use. Building further on the previous embodiment, this embodiment is particularly convenient, when the rotatable arm is not driven itself (but rather externally pushed by the power line approaching the object, because the rope robot climbs upward towards the power line). When the locking mechanism has locked the position of the rotatable arm (of the attachment mechanism) after hooking to the power line, no further energy is required to keep the object in that position.

In an embodiment of the object in accordance with the invention the locking mechanism is driven by a mechanical (and passive) mechanism that is configured for being coupled to and driven by the manipulator unit of the rope robot in operational use. Building further on the previous embodiment, this embodiment is particularly advantageous as it allows the energy for locking the rotatable arm to be provided by the manipulator of the rope robot itself. In addition, it is much easier to provide the required energy directly to the rope robot itself than to the object, which is located in between the rope robot and the power line.

In a third aspect the invention relates to an assembly comprising a rope robot in accordance with embodiments disclosed herein, and an object in accordance with embodiments disclosed herein, wherein the object is being held by the support unit of the rope robot. It is evident that the invention is effectively embodied in both the rope robot as well as the object to be mounted. Both parts comprise technical features required to achieve the desired effect. In view of this the third aspect of the invention relates to the combination of both parts, which entity obviously benefits from the invention.

In a fourth aspect the invention relates to a method for mounting an object, such as a line sensor, to a power line. The method comprises: i) suspending and tensioning at least two ropes between a physical ground and a power line; ii) coupling a rope robot in accordance with the first aspect of the invention with the at least two ropes in such a way that the rope robot can climb up and down the at least two ropes in operational use; iii) providing an object in accordance with the second aspect of the invention on the rope robot; iv) making the rope robot climb up to the power line to bring the object close to the power line; v) mounting the object to the power line with the rope robot, and vi) decoupling the rope robot from the object and making the rope robot climbing down the at least two ropes. The rope robot in accordance with the first aspect of the invention may be sold as a separate entity. Yet, rope robots like the one of the current invention have not been reported before. Many variations and modifications of the rope robot may be possible. Therefore the applicant is entitled to the method, which the robot actually carries out, independent of what kind of rope robot is used. In this method the rope robot may be in accordance with any one of the embodiments disclosed herein, and the object may be in accordance with embodiments disclosed herein, but this is an option as other rope robots and other objects may be used as well.

In an embodiment of the method in accordance with the invention the at least two ropes are suspended to the power line by providing a single rope over a single power line resulting in a double rope into which the rope robot can climb up and down. The use of a single rope hanging over the power line significantly simplifies the method of mounting the object to the power line in that the coupling of the rope to the power line is greatly simplified. All that is needed is suspending the rope between the ground and the power line by coupling the two ends of the single rope to the ground, and subsequently tensioning the rope. Then the rope robot can be conveniently coupled to the rope and the orientation of the rope robot is properly determined relative to the power line.

In an embodiment of the method in accordance with the invention the single rope is provided over the single power line with the help of a manipulator drone or by bringing the rope over the power line and optionally withdrawing it in such a way that the rope is suspended over a single power line only. There has been a tremendous increase in the use of drones in the industry for all sorts of purposes. The inventors realized that a specially designed manipulator drone may be used to pick up the rope and throw its end over one of the power lines, optionally with a lead or heavy object mounted at its end, or with a releasable rope reel mounted at the bottom side of the drone and subsequently dropped between the power lines, wherein the reel rolls out to the ground while falling to the ground, or by simply flying the rope back down to ground. In this way a double rope is obtained, in which the rope robot may conveniently climb up. An alternative technique is to shoot a single rope over the power line and optionally withdrawing it in case it has been provided over more than one power line. This technique is known as such from the prior art and will not be elaborated upon. Another known technique is the use of a so-called "hot-stick", which basically is a long telescopic and electrically insulated pole, which carries at its end a releasable reel with climbing rope (suitable for carrying one person) with a weight at its end. This hot-stick is used to make the reel unroll when held over the power line, dropping the weight on the other side of the power line to the ground, where by a double climbing rope is obtained.

One way of designing and using a drone for this purpose is to attach a reel with one half of the rope length to the drone, then pulling up the other end from the ground, flying over the line and dropping the reel which rolls out by itself down to ground. The weight of the reel itself is sufficient and the drone is not required to carry added weight from heavy objects. The reel may be attached to the end of the rope to act as the heavy object when the entire rope length has been rolled out.

An embodiment of the method in accordance with the invention further comprises: i) providing a further object on the rope robot; ii) making the rope robot climb up to the power line; iii) mounting the further object to the power line, and iv) decoupling the rope robot from the further object and making the rope robot climbing down the at least two ropes. This embodiment concerns a repetition of the major steps of the method for a further object, such as a line sensor, to the power line similar to the first object. It goes without saying that, before the further object is provided on the rope robot, the ropes must first be shifted away from the first object, otherwise the second object will crash into the first object that was mounted before. The shifting of rope may be done by hauling it back and forth while pulling along the line. It must be noted that, depending on the design and orientation of the object, the rope can only be hauled to one side, because the attachment arms of the object and other object features may block the rope from being moved in the opposite direction.

It goes without saying that the invention also relates to a method of removing an object in accordance with the second aspect of the invention from a power line. Such method in its most basic form comprises steps of:
- suspending at least two ropes between a physical ground and a power line near or at the object;
- coupling a rope robot in accordance with the first aspect of the invention with the at least two ropes in such a way that the rope robot can climb up and down the at least two ropes in operational use;
- making the rope robot climb up to the power line close to the object on the power line;
- locking the object to the rope robot and releasing the object from the power line with the rope robot, and making the rope robot climb down the at least two ropes.

The same embodiments as for the method of mounting the object apply in this variant.

The object or further object that is mounted to the power line in accordance with the mentioned aspects of the invention may be selected from the group consisting of: a line sensor, aviation markers, aviation marker lights, and other equipment to be attached to the power line.

BRIEF INTRODUCTION OF THE FIGURES

In the following is described an example of a preferred embodiment illustrated in the accompanying figures, wherein.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the figures for purposes of explanation only and so as to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The invention will be discussed in more detail with reference to the figures. The figures will mainly be discussed in as far as they differ from previous figures. Before the rope robot and the line sensor are discussed in detail, first the application in which they are used is discussed.

Figure 1:
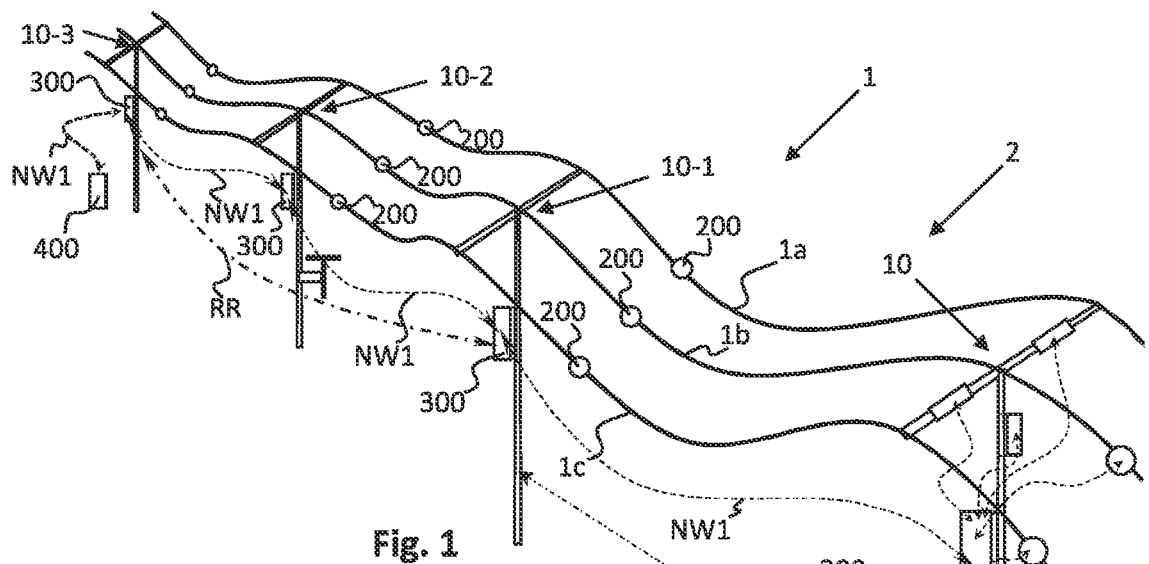
FIG. 1 shows a system for monitoring a power distribution network.
Figure 2:
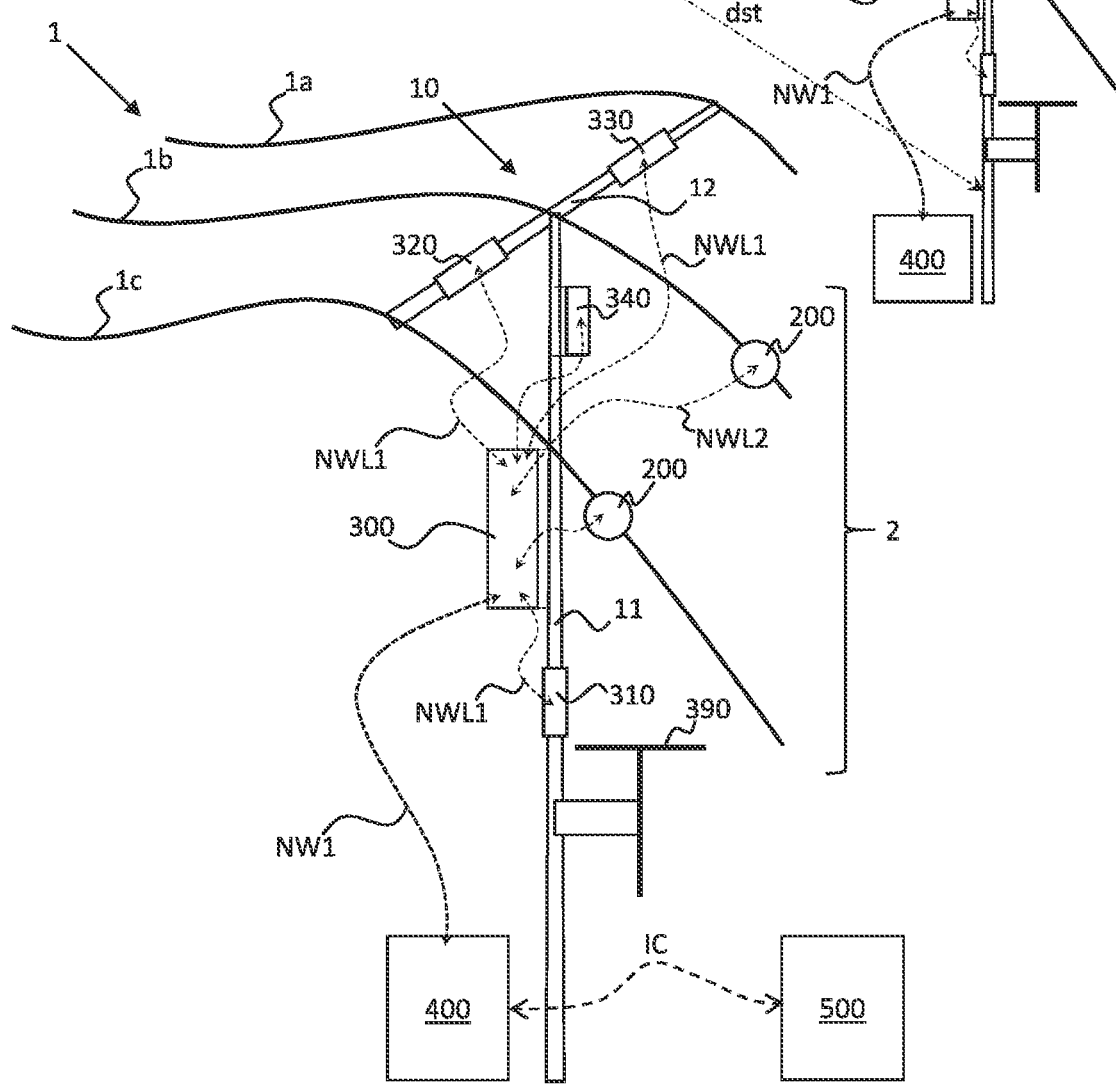
FIG. 2 shows an enlarged view of part of the system of FIG. 1.

FIG. 1 shows a system 2 for monitoring a power distribution network 1 in accordance with a first embodiment. FIG. 2 shows an enlarged view of part of the system of FIG. 1. The power distribution network 1 comprises a plurality of mast constructions 10, 10-1, 10-2, 10-3, which are placed at certain distances dst from each other. For the sake of simplicity, the topology of the environment has not been drawn. In practice however, the power distribution network 1 may cross rough or difficultly accessible areas, including mountains, forests and hills. It is particularly in such areas that the invention is useful, as will be explained further with reference to the figures. The plurality of mast constructions

10, 10-1, 10-2, 10-3 carry three power lines 1a, 1b, 1c in this example embodiment. The power lines 1a, 1b, 1c are typically suspended in crossbars 12 through isolators (not shown). Such isolators are well-known in the field of power distribution networks and are therefore not further discussed. The crossbars 12 are each connected to a respective mast 11 as illustrated. In the current example there is only one crossbar 12 per mast 11, but there may also be more than one crossbar or even no crossbar 12 at all (in case there is only one power line for example). The number of crossbars 12 depends on the amount of power lines 1a, 1b, 1c that are to be distributed. There is a huge variety of mast constructions known from the prior art. The invention is applicable to any kind of mast construction.

In the monitoring system 2 smart modules 300 are affixed directly to the mast constructions 10 as FIG. 2 clearly illustrates. It may be one smart module per mast construction 10 as in FIG. 1 or some mast constructions may be skipped. The inventor's insight in NO20191123 that, while it was known to provide for monitoring intelligence in line sensors that are mounted directly on the power lines, this monitoring can, to a great extent, be performed from a monitoring system 2 that is affixed directly on the mast construction 10. This relatively simple measure greatly reduces the challenges that come along with providing said system only on the power lines. The advantages include easy service access outside high voltage live working and vicinity zones, reduced vibration, reduced effects of high electrical and magnetic fields, stable and redundant energy supply with backup, larger antennas for long range communication and higher power consumption for sensors, processing and radio links. This is also discussed in detail in the introduction of NO20191123. The smart module 300 forms a main ingredient of the monitoring system 2 of FIG. 1. As will be elaborated upon later the smart module 300 may contain computation power, energy supply, memory, but also sensors, because many of the quantities or events of the power distribution network 1 may be directly determined at or in the mast construction 10.

A first main function of the smart module 300 is to create a main wireless communication network NW1 along the power lines 1a, 1b, 1c, i.e. each smart module 300 may communicate with another smart module 300 along the path of the power lines as the dashed arrows illustrate. In an embodiment the main wireless communication network NW1 forms a wireless mesh network, i.e. mesh WIFI. The distance dst between and placement of said construction masts 10 is chosen such that there is "redundancy" built-in in that respective smart modules 300 may also reach non-neighbouring smart modules, i.e. hop over one or more smart modules. This node hopping or rerouting is illustrated by a dash-dot arrow RR. The smart modules 300 may also communicate with data concentrators or gateways 400 as FIGS. 1 and 2. illustrate. These gateways 400 allow for connection to the internet, which may be wired or wireless. FIG. 2 illustrates that the gateways ensure connection between the smart modules 300 and a data centre 500. Between the gateway 400 and the data centre 500 the internet connection IC is symbolically illustrated by a dashed arrow.

A second main function of the smart module 300 is connecting with a sensor system 310, 320, 330, 340, which is configured for determining at least one quantity or event of the power distribution network 1. This sensor system may be comprised in a same housing of the smart module 300 or it may have its own housing and be affixed to another part of the mast construction 10. In FIG. 2 there is mounted a first sensor system 310 directly on the mast 11 of the mast construction 10. The first sensor system 310 may comprise a tension or compression sensor for example, which is configured for determining bending of the mast 11, for example because of a tree or the wind. Alternatively, the first sensor system 310 may comprise an acceleration sensor for determining acceleration or vibrations of the mast construction.

A third main function of the smart module 300 is to communicate information associated with said at least one quantity or event along the main wireless communication network NW1. Information associated with said at least one quantity or event may be obtained by processing the determined quantity or event inside the smart module, which may comprise parts like a processor unit, memory and energy management unit. The whole purpose of the monitoring system 2 is to get the relevant information to the data centre, which is remote from the power distribution network 1. Based upon this information the necessary actions may be initiated, such as maintenance or repair operations in the power distribution network 1.

In FIG. 2 there is mounted a second sensor system 320 and a third sensor system 330 directly on the crossbar 12 of the mast construction 10. Just like the first sensor system 310 these sensors systems 320, 330 may comprise a tension or compression sensor for example, which is configured for determining bending of the crossbar 12, for example because of a tree or the wind. Alternatively, these sensor systems 320, 330 may comprise an acceleration sensor for determining acceleration or vibrations of the crossbar 12. The sensor systems 320, 330 may also be mounted between the isolators (not shown) and the power lines 1a, 1b, 1c. Alternatively, the sensor systems 320, 330 may be mounted on/at the attachment points of the isolators (not shown) to the crossbar 12. In such cases these sensor systems 320, 330 may comprise acceleration or vibration sensors, compression or tension sensors, but also temperature sensors.

In the embodiment of FIG. 2 there is mounted a fourth sensor system 340 directly on the mast 11 yet here a bit closer to the power lines 1a, 1b, 1c. The fourth sensor system 340 may comprise a sparkover sensor as earlier discussed. As is known from the prior art, multiple sparkover sensors 340 may cooperate to determine the location of a sparkover between power lines 1a, 1b, 1c or between a respective power line and ground. Alternatively or additionally, the fourth sensor system 340 may comprise a camera for optical inspection of the power distribution network 1 including the power lines 1a, 1b, 1c.

Even though the core idea of the monitoring system 2 is to provide "intelligence" or "smartness" directly on the mast construction 10, the monitoring system 2 may still be supplemented with line sensors 200 as illustrated, i.e. line sensors are not necessarily excluded. These line sensors 200 may be configured with further sensors, such as current sensors, temperature sensors, acceleration or vibration sensors, inclination sensors, compression or tension sensors, or sparkover sensors. For example, a line sensor allows for direct measurement of electrical and magnetic field around each power line wire compared to same sensors in the smart module, picking up a complex field from all conductors, also affected by the mast infrastructure and ground conditions. Line sensors 200 may be very complex devices, which are hanged on or suspended on the power lines 1a, 1b, 1c, or they are mounted directly on an insulator that is fixed to the power line 1a, 1b, 1c.

Nevertheless, the insight of the invention in NO20191123 is that many of these sensors may be affixed directly to the mast construction 100 as it will be easier to implement in a robust and convenient way.

In the embodiment of FIGS. 1 and 2 some of the mast constructions 10, 10-2 have been provided with a weather station 390 connected to the smart module 300 (connection not shown, may be wired or wireless), which is symbolically illustrated with a T-shape. The weather station 390 is preferably placed lower on the mast constructions 10, 10-2 because of the risk of being hit by lightning.

The embodiment of FIG. 2 also illustrates that the connections between said smart module 300 and the sensors 310, 320, 330, 340, 380 and weather station 390 is formed by one or more local wireless communication networks NWL1, NWL2. Alternatively, these connections may be wired.

It must be noted that the monitoring system 2 in accordance with FIGS. 1 and 2 may comprise: the smart modules 2 on the mast constructions 10, 10-1, 10-2, 10-3 (including at least one sensor system);
the sensor systems 310, 320, 330, 340 on the mast constructions (if present);
the line sensors 300 on the power lines 1a, 1b, 1c (if present); the weather stations 390 (if present).

The embodiments of the invention described hereinafter are about mounting a line sensor on a power line under live line conditions, i.e. live line operations. A first main ingredient of the invention is to use a robot to do the job, particularly a robot, which can climb in a double rope that is suspended between the ground and the power line.

Figure 3:
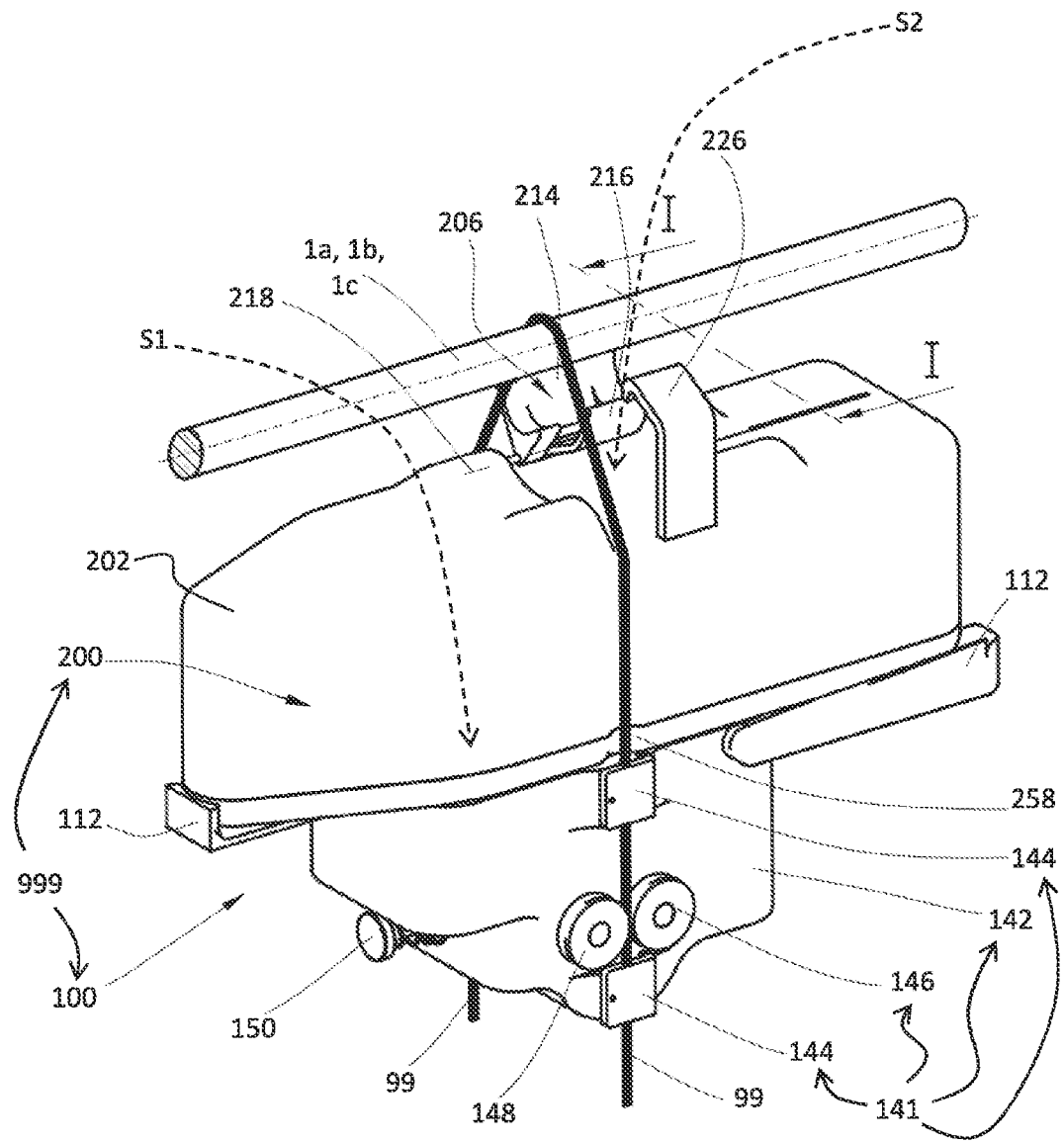
FIG. 3 shows a perspective view oblique from above of an assembly of a rope robot with a line sensor in a position shortly before mounting of the line sensor to a power line.

FIG. 3 shows a perspective view oblique from above of an assembly 999 of a rope robot 100 with a line sensor 200 in a position shortly before mounting of the line sensor 200 to a power line 1a, 1b, 1c. Even though FIGS. 3 to 17 and the description hereinafter mainly describe the mounting of the line sensor 200 to the power line 1a, 1b, 1c using the rope robot 100, it is explicitly mentioned that the invention is also applicable to mounting other objects to the power line 1a, 1b, 1c. Examples of such objects are: Aviation markers (balls or other forms) or lights and other equipment.

FIG. 3 shows part of a live line rope 99 that is hung over the power line 1a, 1b, 1c as illustrated. A live line rope 99 typically comprises an electrically-insulating material and also satisfies the requirements for moisture intrusion set by the standards for live line work. The rope robot 100 has been provided with the line sensor 200 on its upper surface S1, wherein the line sensor 200 is releasable from the rope robot 100. In order to facilitate holding of the line sensor 200 the rope robot 100 is provided with a support unit 112, which will be further explained with reference to other figures. The most important function of the support unit 112 is, together with the tensioned rope 99 itself and the shaft coupling 138, to confine the line sensor 200 during climbing along the rope 99 in that the line sensor 200 cannot slide on the rope robot 100 and fall on the ground. In an alternative embodiment (not shown) the robot 100 grips or clamps the line sensor 200, which provides another way of holding the line sensor such that it cannot fall. The rope robot 100 and the line sensor 200 form the assembly 999 during upward (when mounting) or downward climbing (when demounting) of the rope robot 100 along the rope 99 and during connection and disconnection of the line sensor 200 and the power line wire 1a, 1b, 1c. Having the shaft coupling and generally robot interface at the underside of the line sensor reduces the risk of ice, snow and dirt blocking the interface for later removal.

A second main ingredient of the invention is that the object (line sensor) 200 is prepared for being mounted to the power line. The line sensor 200 has been provided with an attachment mechanism 206 on an upper side S2 of a line sensor housing 202 as illustrated. The attachment mechanism 206 is configured for releasable connection with the power line 1a, 1b, 1c. The line sensor 200 also comprises a locking mechanism 226, which will be explained in more detail later.

Figure 4:
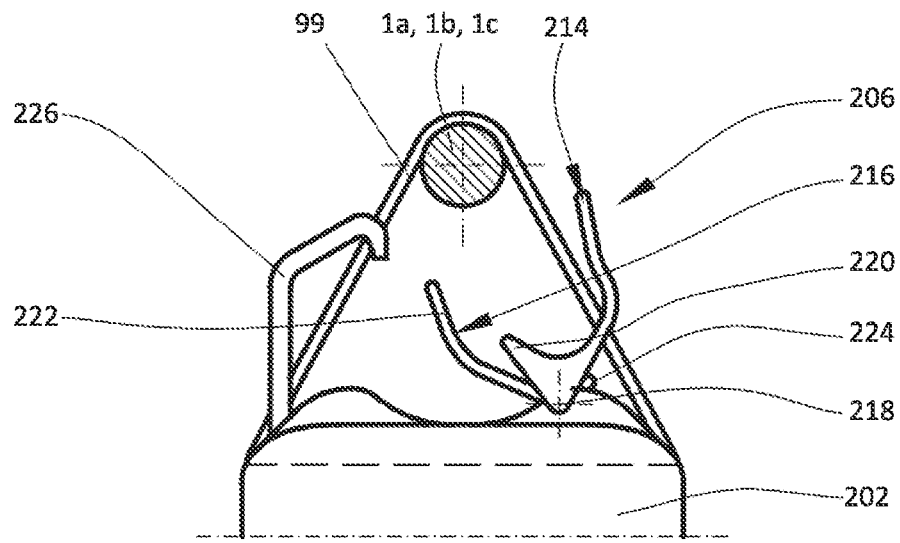
FIG. 4 shows the line sensor at the moment when the line sensor with the attachment mechanism is located just below the power line.
Figure 5:
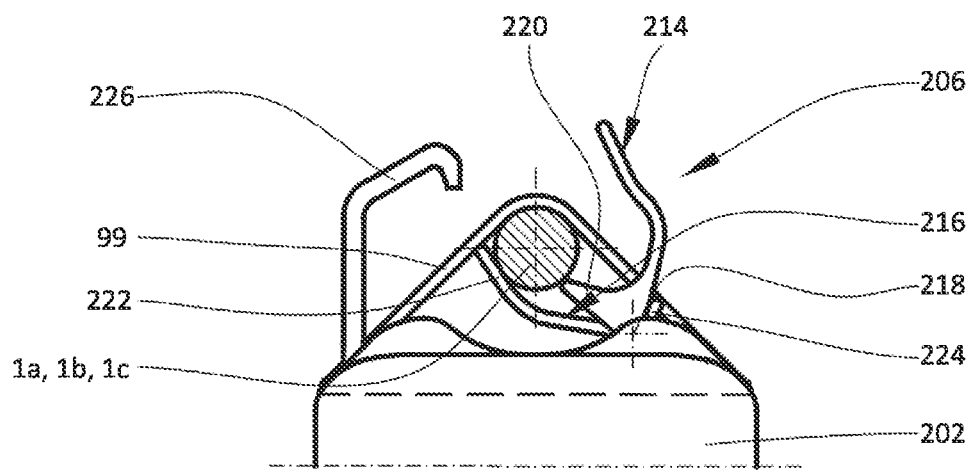
FIG. 5 shows the line sensor at the moment when the attachment mechanism touches the power line.
Figure 6:
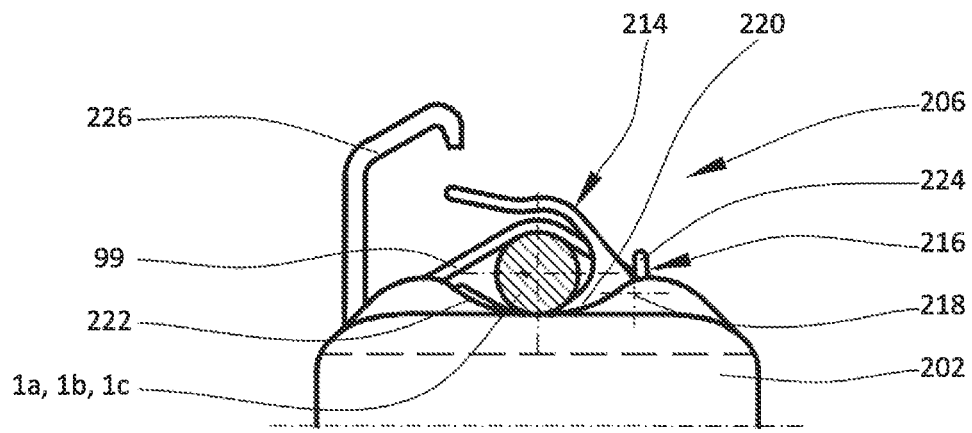
FIG. 6 shows the line sensor at the moment when the attachment mechanism is completely pressed against the line sensor housing by the power line.
Figure 7:
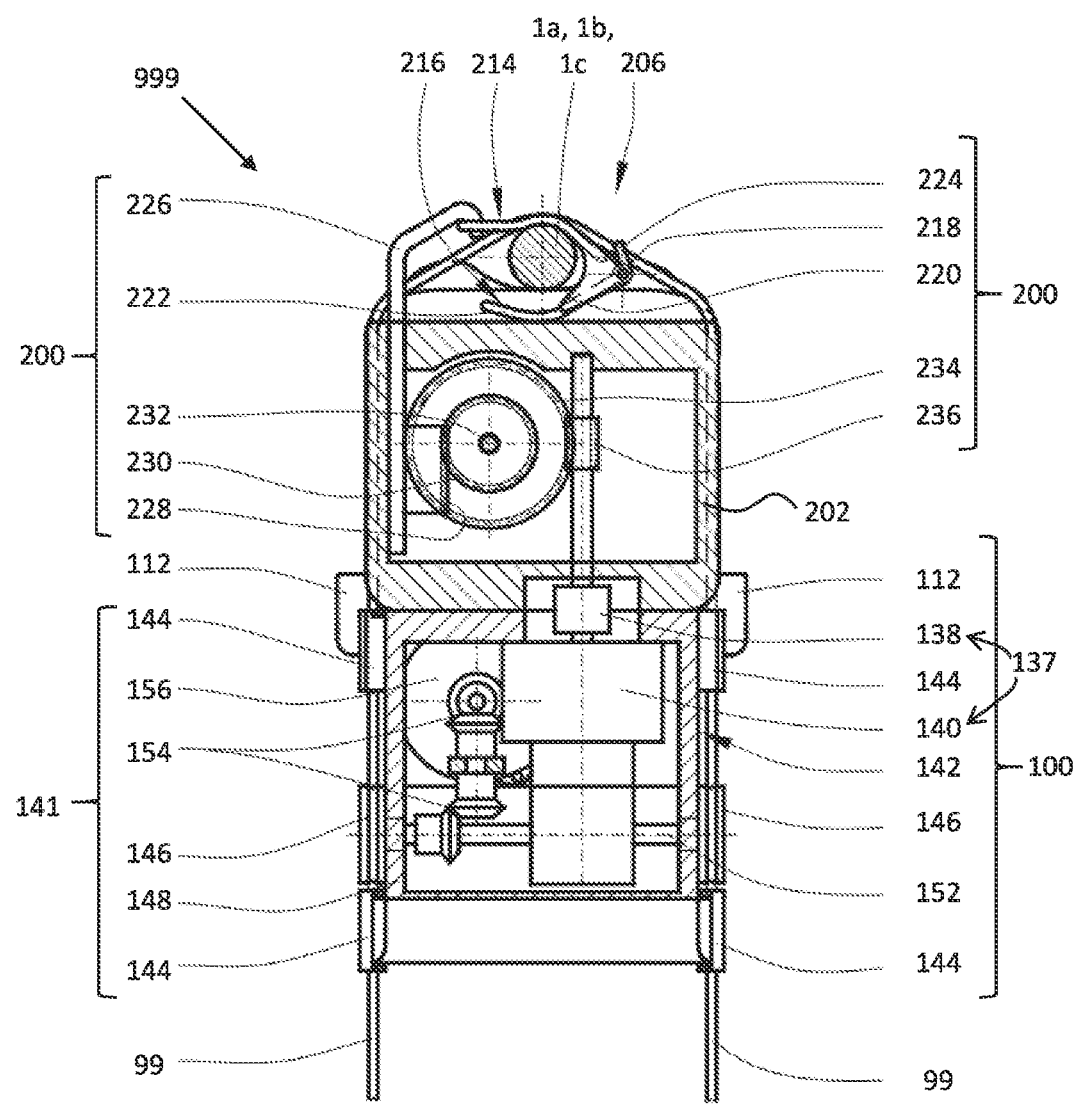
FIG. 7 shows a schematic section I-I of FIG. 4 at the moment when the locking mechanism locks the position of the attachment mechanism completing mounting of the line sensor to the power line.

FIGS. 4 to 7 illustrate the method of mounting the line sensor 200 to the power line 1a, 1b, 1c with the rope robot 100. FIG. 4 shows the line sensor 200 at the moment when the line sensor 200 with the attachment mechanism 206 is located just below the power line 1a, 1b, 1c. FIG. 5 shows the line sensor 200 at the moment when the attachment mechanism 206 touches the power line 1a, 1b, 1c. FIG. 6 shows the line sensor 200 at the moment when the attachment mechanism 206 is completely pressed against the line sensor housing 202 by the power line 1a, 1b, 1c. FIG. 7 shows a schematic section I-I of FIG. 4 at the moment when the locking mechanism 226 locks the position of the attachment mechanism 206 completing mounting of the line sensor to the power line.

As mentioned before, the line sensor 200 is releasable from the rope robot 100 and is held in mutually correct position by the support unit 112, but also by gravity force, the tensioned ropes and a shaft coupling 138 between the rope robot 100 and the line sensor 200, which will be discussed later. The attachment mechanism 206 of line sensor 200 comprises a main attachment arm 214 and an auxiliary attachment arm 216 as illustrated in FIG. 3-7. The main attachment arm 214, referred to as rotatable arm, is arranged to be able to rotate about an attachment arm shaft 218 between an open position as shown in FIGS. 3 and 4, and a closed position where it rests against the power line 1a, 1b, 1c as shown in FIG. 6. The main attachment arm 214 is provided with a lower tip 220 to facilitate the closing action, see FIGS. 4 to 7 and the correspondence part of the description. The auxiliary attachment arm 216 is angular shaped and is in this embodiment also rotatable about the same attachment arm shaft 218. A lower tip 222 of the auxiliary attachment arm 216 is arranged to be pressed against the power line 1a, 1b, 1c, wherein an upper tip 224 of the auxiliary attachment arm 216 thereby rotates and presses the main attachment arm 214 to rotate in the same direction in a closing direction. The upper tip 224 of the auxiliary attachment arm 216 acts as a rocker.

The earlier mentioned locking mechanism 226 comprises a locking arm as illustrated.

The locking mechanism 226 is displaceable between an open position as shown in FIGS. 3 to 6, and a closed position where it is hooked into the main attachment arm 214, see FIG. 7. Refer to FIG. 7, the locking mechanism 226 is provided with a rack rail 228 which is in engagement with a gear 230. The gear 230 is located inside the line sensor housing 202 and is rotatable about a gear shaft 232 axis shared with a worm gear 234. The worm gear 234 is driven by a worm shaft 236. The worm shaft 236 is drivable via a releasable shaft coupling 138 by an (electrical) manipulation motor 140 (attachment motor), both forming part of a manipulator unit 137 of the rope robot 100. The shaft coupling 138 can for example be a so-called claw or jaw shaft coupling, such that the rope robot 100 is further locked to the line sensor 200 when rotational torque of one or both directions is applied by the shaft coupling 138. The worm gear 234 and the worm shaft 236 may be self-locking, such that the line sensor 200 locking mechanism 226 can only be opened by torque in opposite direction of the locking action at the shaft coupling 138.

The rope robot 100 is also arranged with a rope robot housing 142. The earlier-mentioned support arms 112 are attached to the rope robot housing 142. Furthermore, rope guides 144 are provided at two sides of the rope robot housing 142 for guiding the rope 99. As illustrated the rope 99 is arranged on both sides of the rope robot housing 142 between a rope drive wheel 146 and a rope clamping wheel 148 on each side of the housing 142.

The clamping force on the rope 99 may be adjusted via a rope clamping adjustment screw 150 as illustrated. The rope drive wheels 146 are driven via a shaft 152 and two bevel gears 154 by an (electrical) rope climbing motor 156.

The line sensor housing 202 is arranged with rope guide recesses 258 for the rope 99, see FIG. 3. The rope guide recesses 258 are arranged to contribute to the line sensor housing 202 aligning properly with the power line wire 1a, 1b, 1c when the line sensor 200 is pressed against the power line wire 1a, 1b, 1c.

The rope robot 100 may have a crawler unit 141. The crawler unit 141 is defined as all parts that contribute to climbing up and down the rope 99, that is the rope climbing motor 156, the wheels 146, 148, the rope guides 144, the wheel shaft 152 and the bevel gear 154. The crawler may also give static torque at zero speed for pressing the line sensor 200 up against the power line 1a, 1b, 1c during the attachment and locking process.

It must be stressed at this stage that the current embodiments of the rope robot 100 and the line sensor 200 are very specifically described as far as their structure is concerned. It goes without saying that the mechanical functions of the moving and rotating parts may be carried out in many different ways. All such variations are considered to fall within the scope of the invention as claimed.

The rope climbing motor 156 and the manipulation motor 140 may be powered by a battery and electronic motor drives. Both motors 140, 156 may be controlled from the ground by pulling a separate control rope (not shown) attached under the rope robot 100 arranged with a control rope force sensor. Alternatively, this may be done by wireless communication, or even by an (on-board) autonomous rope robot control system. The control rope may be the same type as the rope 99.

When a line sensor 200 is prepared for mounting to a power line 1a, 1b, 1c, the rope 99 is first arranged over the power line wire 1a, 1b, 1c. Then the two resulting rope ends are attached to the ground and subsequently entered into their corresponding (openable) rope guides 144 and in between their corresponding rope driving wheels 146 and rope clamping wheels 148. The adjustment screw 150 is adjusted if necessary to provide required frictional force against the rope 99.

When the rope robot 100 is aligned, the line sensor 200 can be placed on the support unit 112 of the rope robot 100, whereby the shaft coupling 138 is engaged with the attachment motor 140. The climbing motor 156 is started and lifts the assembly 999 up towards the power line wire 1a, 1b, 1c. The attachment mechanism 206 is then in its open position as shown in FIGS. 3 and 4.

When the assembly 999 is offset further against the power line 1a, 1b, 1c, the lower tip 222 of the auxiliary attachment arm 216 is pressed against the power line 1a, 1b, 1c. A further offset of the assembly 999 against the power line wire 1a, 1b, 1c rotates the auxiliary attachment arm 216 about the attachment arm shaft 218, pressing the auxiliary attachment arm's upper tip 224 against the main attachment arm 214. The main attachment arm 214 is then rotated about the attachment arm shaft 218 in such a way that the lower tip 20 of the main attachment arm 214 comes in between the power line 1a, 1b, 1c and the line sensor 200, see FIGS. 5 and 6. Further offset of the assembly 999 towards the power line 1a, 1b, 1c causes the power line 1a, 1b, 1c to press against the lower tip 220, which rotates the main attachment arm 214 to its closed position. The main attachment arm 214 is subsequently locked by starting the attachment motor 140 via the mechanisms 128, 130, 134, 136 and 138 moving the locking mechanism 226 to a locking engagement with the main attachment arm 214 as shown in FIG. 7. Because of the worm gear 234 and the worm shaft's 236 self-locking property, no further braking or locking of the worm gear 234 is required to maintain the locking mechanism 226 in firm clamping position with the power line wire 1a, 1b, 1c. The line sensor 200 is thereby attached to the power line 1a, 1b, 1c in a safe way.

The rope guides 144 and rope guide recesses 258 cause the rope 99 to maintain its correct alignment with the assembly 999 during the climb along the rope 99. This assures that the line sensor 200 aligns properly with the power line 1a, 1b, 1c so that the attachment mechanism 206 functions optimally.

By releasing the torque of the manipulation motor (attachment motor) 140 and reversing the climbing motor 156 direction of rotation, the rope robot 100 disconnects from the line sensor 200 and climbs back down the rope 99, either for removal from the ropes 99 or for mounting of a further line sensor at a location displaced from the first location. After removal of the rope robot 100, the rope 99 is pulled down. The rope robot 100 may then be used for mounting of a further line sensor (after proper installation of the live line rope 99).

In case of a failure in the rope robot 100, the rope robot 100 may be pulled down manually as the clamping wheels 148 only provide a limited frictional force against the rope 99, preferably using the control rope (not shown) or in an emergency by pulling one end of the rope 99 itself.

If it becomes applicable to remove a line sensor 200 from the power line 1a, 1b, 1c, the rope 99 is arranged over the power line wire 1a, 1b, 1c and moved/dragged along the power line towards the line sensor 200, automatically stopping adjacent to the attachment mechanism 206. The rope robot 100 then climbs up until it is pressed against the line sensor 200. The shaft coupling 138 is engaged and the attachment motor 140 is reversed, locking the line sensor 200 to the rope robot 100 by torque both during and after releasing the attachment mechanism 106. When the rope robot 100 starts descending, the line sensor 200 follows the rope robot 100 down while staying attached/locked to the rope robot 100.

The following figures have been added in order to explain some further aspects and details of rope robot 100 and the line sensor 200, which may be difficult to extract from FIGS. 1 to 7. As a general remark it is to be noted that figures are mainly discussed in as far as they add something to what was discussed before. Same reference numbers indicate same parts if not indicated differently.

Figure 8:
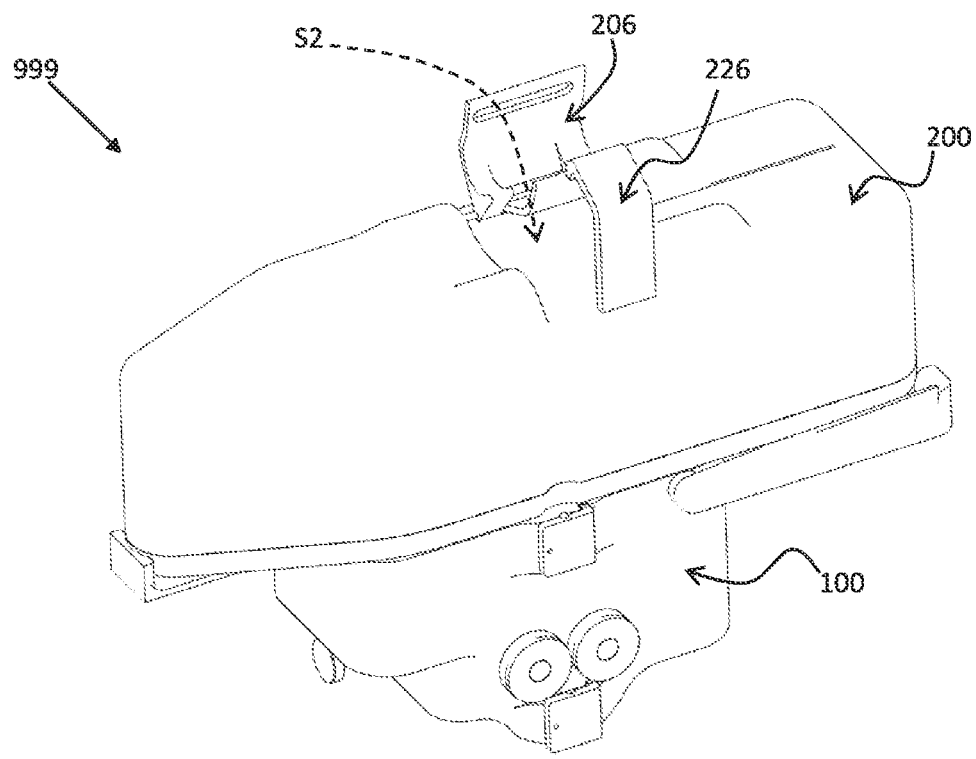
FIG. 8 shows a perspective view of the assembly of FIG. 3 without the rope.

FIG. 8 shows a perspective view of the assembly 999 of FIG. 3 without the rope. This figure illustrates how the line sensor 200 is provided on the rope robot 100. Furthermore it is visible from this figure that the upper side S2 of the line sensor is provided with the attachment mechanism 206 and the locking mechanism 226, which already have been explained to a certain extent earlier and will be explained in more detail later.

Figure 9:
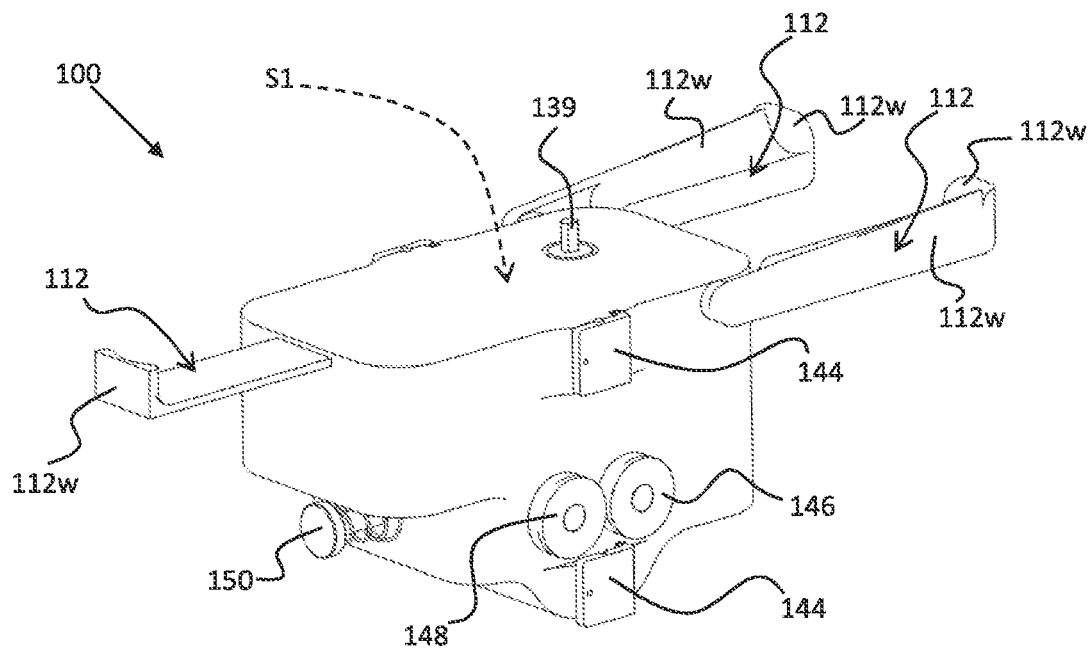
FIG. 9 shows a perspective view of FIG. 8 with the line sensor left out, illustrating an embodiment of the rope robot in accordance with the invention.

FIG. 9 shows a perspective view of FIG. 8 with the line sensor left out, illustrating an embodiment of the rope robot 100 in accordance with the invention. This figure more clearly shows how the support unit 112 on the upper side 51 of the rope robot 100 is shaped such that the line sensor (not shown) can be confined preventing it from falling. The support unit 112 comprises a plurality of (here in this example 3) support arms, which each have upstanding confinement walls 112w as illustrated. A further aspect which is now more clearly disclosed is the connection between the manipulator unit of the rope robot 100 and the line sensor. A driving shaft 139 is visible, which sticks out at the upper side S1 of the rope robot. This driving shaft 139 is the part which is coupled to a shaft in the line sensor (not shown) via the earlier discussed shaft coupling 138 in FIG. 7. Further it is more clearly visible how the rope guides 144 are mounted in a pivotable way in this embodiment, allowing the rope robot to be mounted to already suspended live line ropes 99. After opening said rope guides 144 the ropes 99 can be placed between the driving and clamping wheels 146, 148 as earlier discussed. The rope clamping adjustment screw 150 will be discussed with reference to another figure.

Figure 10:
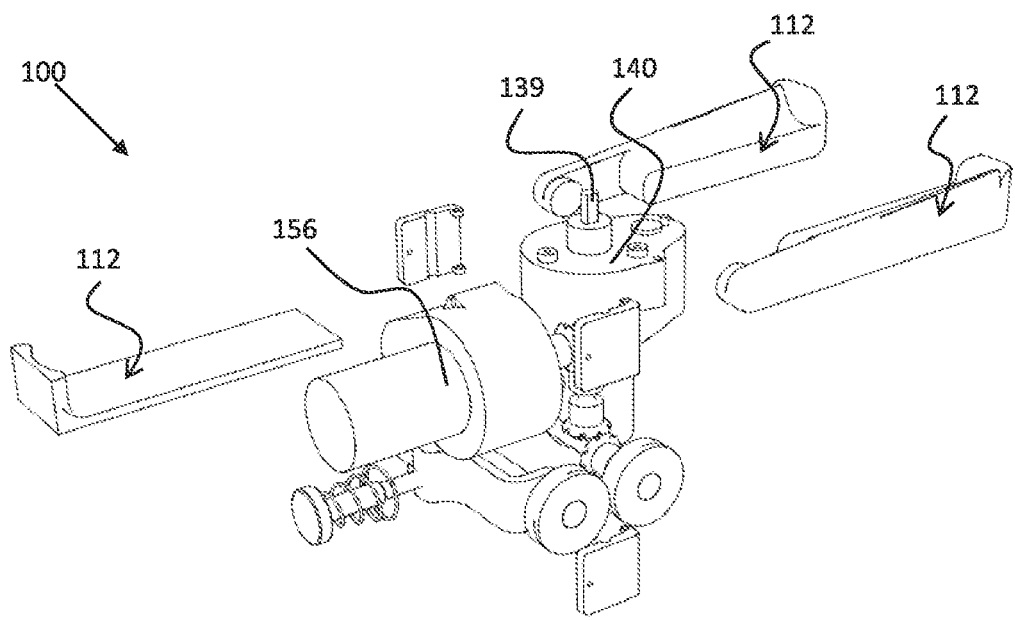
FIG. 10 shows a perspective view of the rope robot of FIG. 8 without the rope robot housing.
Figure 11:
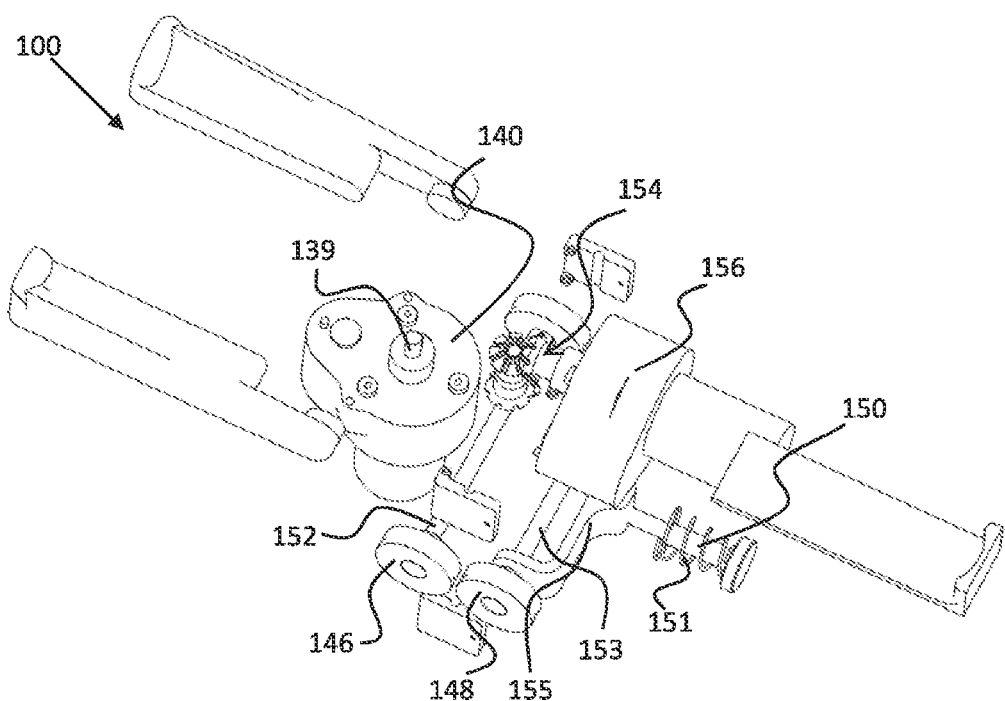
FIG. 11 shows a different perspective view of the rope robot of FIG. 8 without the rope robot housing.

FIG. 10 shows a perspective view of the rope robot 100 of FIG. 8 without the rope robot housing. FIG. 11 shows a different perspective view of the rope robot 100 of FIG. 8 without the rope robot housing. These figures serve to facilitate further understanding of the inside of the rope robot 100. A first aspect is that the respective motors are now visible as well as the way they are coupled to different parts for driving them.

The first motor in FIGS. 10 and 11 is the rope climbing motor 156 that is coupled to the rope driving wheels 146 via a bevel gear 154, which drives the wheel shaft 152 to which the rope driving wheels 146 are mounted. The rope clamping wheels 148 are mounted on a further wheel shaft 153, which is not driven by a motor in this example (but it may be in other embodiments). The second motor is the manipulation motor 140, which is configured for driving the locking mechanism 226 via said driving shaft 139 and shaft coupling 138 as earlier discussed.

FIG. 11 illustrates how the earlier-mentioned rope clamping adjustment screw 150 acts on the further wheel shaft 153. Rotation of the adjustment screw 150 results in a translation of the bracket 155, which suspends the further wheel shaft 153. There is also shown a spring 151, which serves to preload the clamping pressure on the clamping wheels 148.

Figure 12:
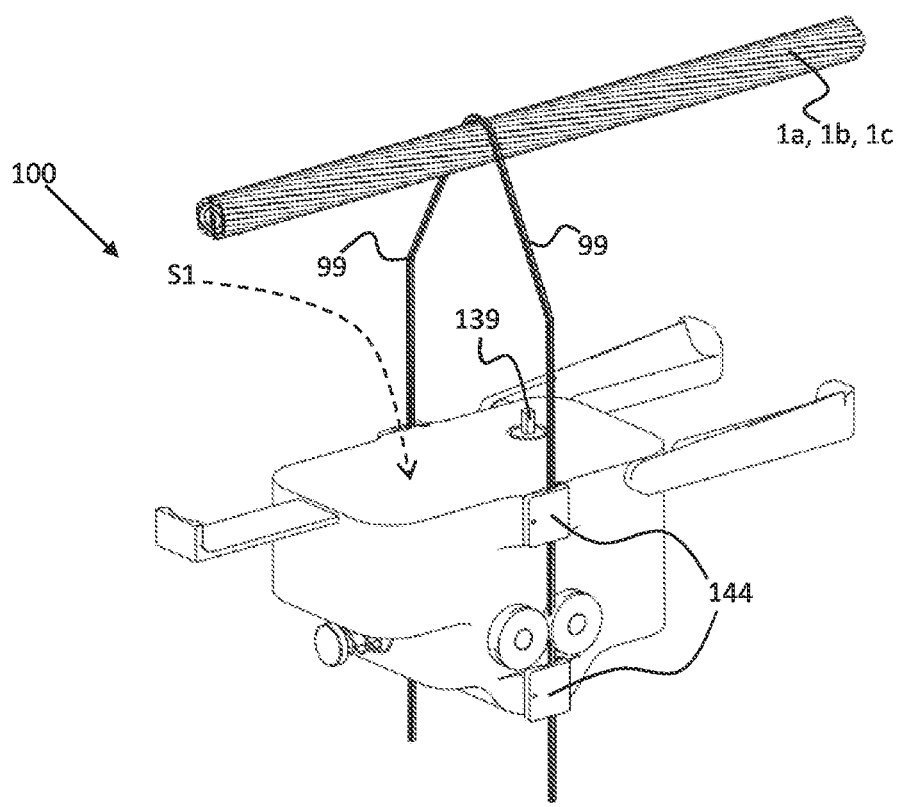
FIG. 12 shows a perspective view of the rope robot of FIG. 9 when mounted on a rope suspended on a power line.
Figure 13:
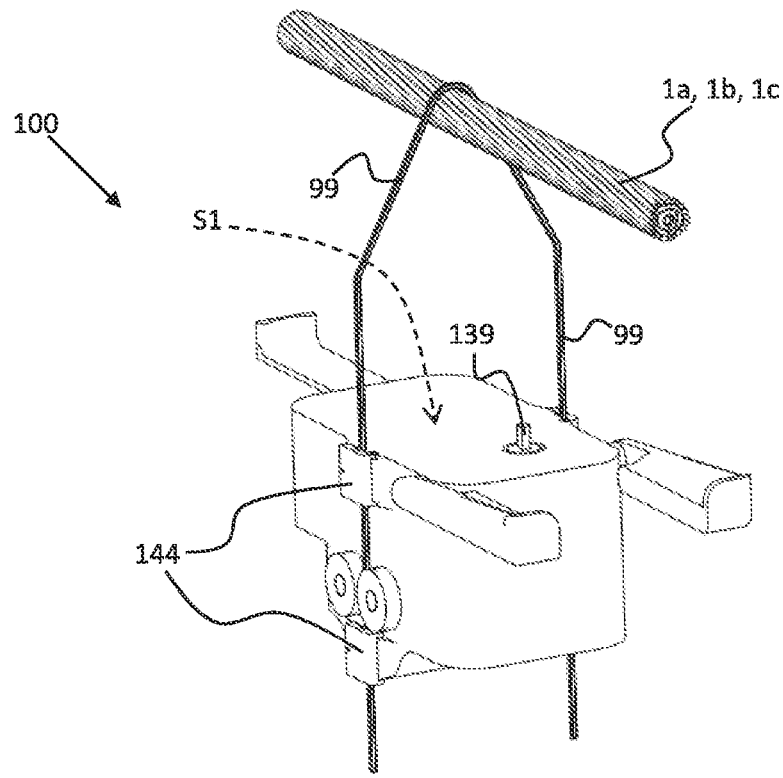
FIG. 13 shows a different perspective view of the rope robot of FIG. 12.

FIG. 12 shows a perspective view of the rope robot 10 of FIG. 9 when mounted on a rope suspended on a power line. FIG. 13 shows a different perspective view of the rope robot 100 of FIG. 12. These figures mainly serve to illustrate how the live line rope 99 is suspended over the power line 1a, 1b, 1c and guided along the line sensor (left out) and by the rope guides 144. Also it is clearly shown how the upper side S1 of the rope robot 100 is prepared for receiving the line sensor (not shown).

Figure 14:
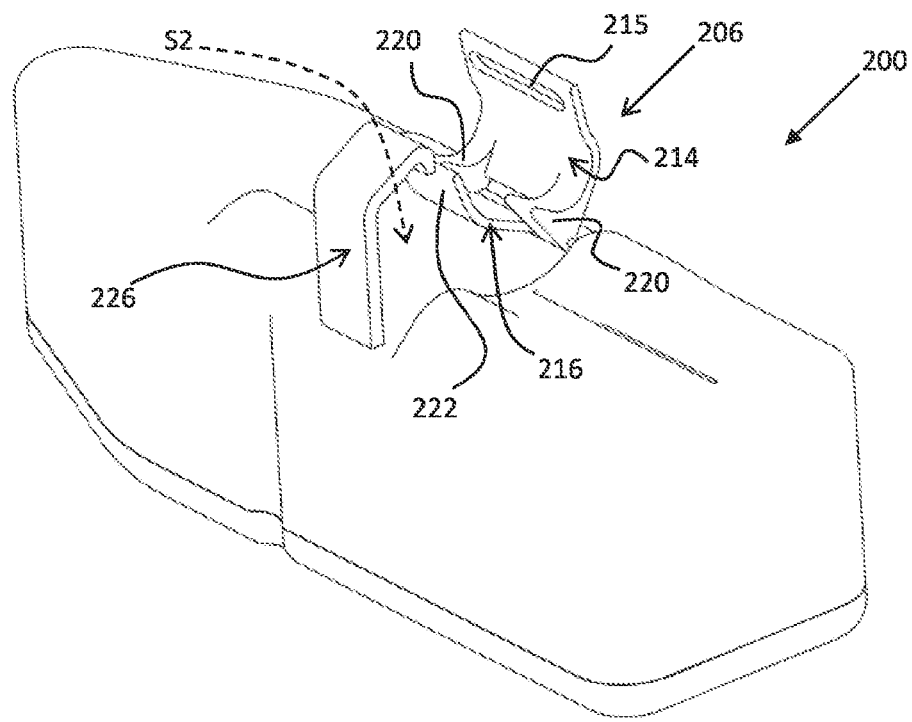
FIG. 14 shows a perspective view of an embodiment of the line sensor in accordance with the invention.
Figure 15:
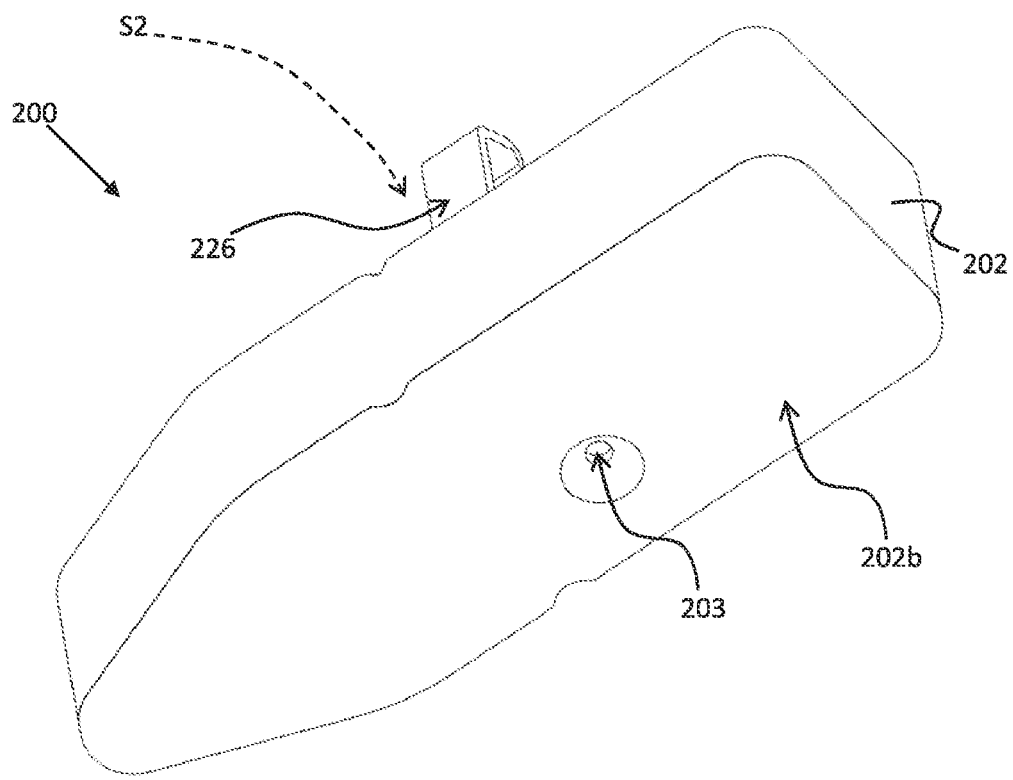
FIG. 15 shows a different perspective view of the line sensor of FIG. 14.

FIG. 14 shows a perspective view of an embodiment of the line sensor 200 in accordance with the invention. FIG. 15 shows a different perspective view of the line sensor 200 of FIG. 14. FIG. 14 mainly serves to illustrate how the upper side S2 of the line sensor 200 is prepared with the attachment mechanism 206 and the locking mechanism 226. All the earlier discussed parts 214, 216, 220, 222 in connection with the attachment mechanism 206 are clearly visible in terms of their shape, interaction and location. A locking hole 215 is also clearly visible in the main attachment arm 214 (rotatable arm). This locking hole 215 is designed to receive the locking member 216 as will be explained with reference to FIGS. 16 and 17.

FIG. 15 mainly serves to illustrate how the bottom side of the line sensor 200 is prepared for receiving the shaft coupling 138 that is coupled with the driving shaft 139 of the manipulation motor 140. In the bottom 202b of the line sensor housing 202 there is provided a hole 203, which is placed at a location coinciding with the location of the driving shaft 139, such that the internal mechanism in the line sensor 200 may be driven by the manipulation motor.

Figure 16:
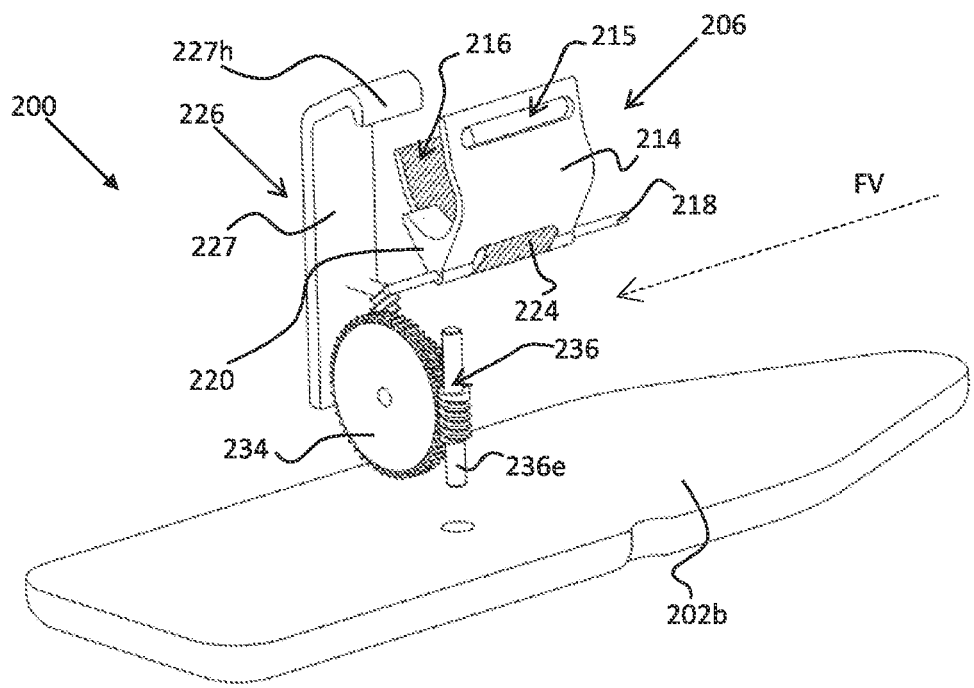
FIG. 16 shows the line sensor of FIG. 14 with the line sensor housing left out, illustrating the attachment mechanism.
Figure 17:
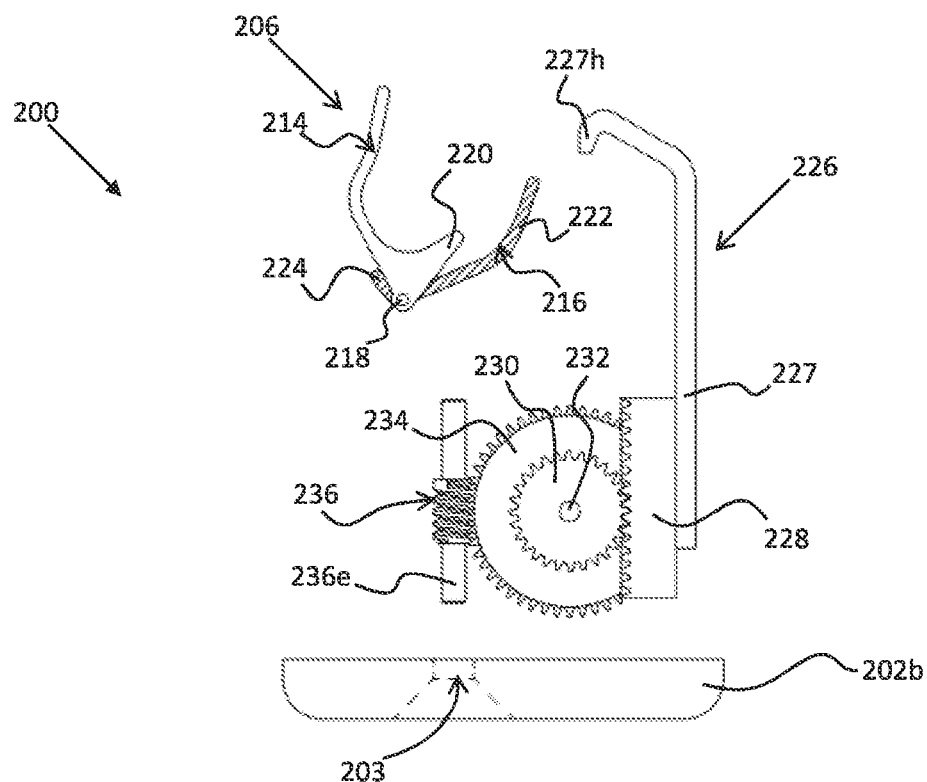
FIG. 17 shows a front view of FIG. 16.

FIG. 16 shows the line sensor 200 of FIG. 14 with the line sensor housing left out, illustrating the attachment mechanism. FIG. 17 shows a front view FV of FIG. 16. The bottom 202b of the line sensor housing 202 is still visible, including its hole 203. All the earlier discussed parts 214, 215, 216, 218, 220, 222, 224 in connection with the attachment mechanism 206 are clearly visible in terms of their shape, interaction and location.

These figures serve to illustrate how the locking mechanism 226 is designed and configured. A first main part of the locking mechanism 226 is the locking arm 227 with a hook 227h at its end. This hook 227h is designed for hooking into the earlier-discussed hole 215 in the main attachment arm 214 for locking the position thereof. Locking is achieved by pulling down the locking arm 227. The locking arm 227 is coupled with the earlier-discussed rack rail 228, which in its turn is driven by a gear 230, which is rotatable around a gear shaft 232, as illustrated. A worm gear 234 is coupled with the gear 230, which is in its turn driven by a worm shaft 236 as illustrated and discussed earlier. The worm shaft 236 has an end 236e, which is to be connected to the earlier discussed driving shaft 139 in FIGS. 10 to 13 via a shaft coupling (not shown here but with number 138 in other figures).

The invention has been described in the field of mounting objects to power lines, in particular line sensors. However, the invention may also be used in a wider range of applications, such as mounting objects to the power line like aviation marker balls (or other forms) or aviation marker lights for visibility to aviation and any other equipment to be attached to power lines.

The particular embodiments disclosed above are illustrative only, as the invention may be modified and practiced in different but equivalent manners apparent to those skilled in the art having the benefit of the teachings herein. Concerning the provision of the rope over the power line one might think of first providing a thinner more lightweight line (like the ones used for fishing) over the power line and then pulling a stronger and heavier rope up.

The person skilled in the art may easily find alternative solutions for tightening, tensioning, and mounting parts. The invention covers all these variants. No limitations are intended to the details of construction or design herein shown. It is therefore evident that the particular embodiments disclosed above may be altered or modified and all such variations are considered within the scope of the invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements. In the device claims enumerating several means, several of these means may be embodied by one and the same item of hardware.

The invention claimed is:

1. A rope robot being configured for climbing along at least two ropes that are substantially vertically suspended and tensioned between a physical ground and a power line of a power distribution network and for mounting an object to the power line, wherein the rope robot comprises:
a rope robot housing;
a crawler unit mounted on or in the rope robot housing for receiving and clamping onto the at least two ropes and for climbing up and down the at least two ropes in operational use, the crawler unit comprises at least two sets of wheels configured in such a way that one rope is clamped in between each pair of wheels, and wherein at least one of said wheels of each pair is driven by a rope climbing motor for driving the crawler unit;
a support unit provided at an upper side of the rope robot housing of the rope robot, the support unit comprising a shaft coupling placed in the robot housing in such a way that the shaft coupling sticks out at an upper side of the rope robot, such that the support unit is configured for holding the object, wherein the upper side is defined as the side of the rope robot housing facing up when the at least two ropes are oriented substantially vertically in operational use with the rope robot being coupled to the object, and
a manipulator unit comprising a manipulation motor coupled to and driving the shaft coupling, the manipulator unit configured for manipulating the object for mounting the object to the power line when within reach.

2. The rope robot in accordance with claim 1, wherein the crawler unit comprises a wheel shaft between said wheels that are driven, which wheel shaft is driven by the rope climbing motor via a bevel gear that is rotatably coupled with the wheel shaft.

3. The rope robot in accordance with claim 1, wherein the support unit is configured and shaped for receiving the object in a confined manner, is configured and shaped for gripping and holding the object, or is configured and shaped for receiving the object in a confined manner and gripping and holding the object.

4. The rope robot in accordance with claim 1, wherein the manipulation motor and the shaft coupling are placed in the rope robot housing in such a way that the shaft coupling sticks out at the upper side of the rope robot for allowing the object to be connected to the shaft coupling and driven by the manipulation motor.

5. A method for mounting an object to a power line, wherein the method comprises:
suspending and tensioning at least two ropes between a physical ground and the power line;
providing the rope robot in accordance with claim 1;
coupling the rope robot, with the at least two ropes in such a way that the rope robot can climb up and down the at least two ropes in operational use;
providing the object, on the rope robot;
making the rope robot climb up to the power line to bring the object close to the power line;
mounting the object to the power line with the rope robot, and
decoupling the rope robot from the object and making the rope robot climbing down the at least two ropes.

6. The method in accordance with claim 5, wherein the at least two ropes are suspended to the power line by providing a single rope over a single power line resulting in a double rope into which the rope robot can climb up and down.

7. The method in accordance with claim 6, wherein the single rope is provided over the single power line with the help of a manipulator drone or by bringing the rope over the power line and optionally withdrawing the rope in such a way that the rope is suspended over the single power line only.

8. The method in accordance with claim 5, wherein the method further comprises:
providing a further object on the rope robot;
making the rope robot climb up to the power line;
mounting the further object to the power line, and
decoupling the rope robot from the further object and making the rope robot climb down the at least two ropes.

9. The method in accordance with claim 5, wherein the object is selected from a group consisting of: a line sensor, an aviation marker, an aviation marker light and other equipment to be attached to the power line.

10. The rope robot in accordance with claim 1, wherein when the rope robot housing is coupled to the at least two ropes via the at least two sets of wheels in operational use, the at least two ropes are configured to confine sides of the object.

11. The rope robot in accordance with claim 1, wherein the rope robot housing comprises an upper surface which is configured to interface with a lower portion of the object, and
wherein the support unit further comprises one or more upstanding portions, each of the one more upstanding portions sticks out past the upper surface of the rope robot housing and is configured to interface with a portion of the object to thereby prevent the object from sliding in a direction perpendicular to the upper surface, the one or more upstanding portions including one or more of:
an upstanding confinement wall of a support arm; or
a shaft coupled to the manipulation motor and sticking out past the upper surface of the rope robot.

12. An object for being mounted to a power line, the object being configured for being received by a rope robot which is configured for climbing along at least two ropes that are substantially vertically suspended and tensioned between a physical ground and the power line and for mounting the object to the power line, the rope robot comprising a rope robot housing; a crawler unit mounted on or in the rope robot housing for receiving and clamping onto the at least two ropes and for climbing up and down the at least two ropes in operational use, the crawler unit comprises at least two sets of wheels configured in such a way that one rope is clamped in between each pair of wheels, and wherein at least one of said wheels of each pair is driven by a rope climbing motor for driving the crawler unit; a support unit provided at an upper side of the rope robot housing of the rope robot, the support unit comprising a shaft coupling placed in the robot housing in such a way that the shaft coupling sticks out at an upper side of the rope robot, such that the support unit is configured for holding the object, wherein the upper side is defined as the side of the rope robot housing facing up when the at least two ropes are oriented substantially vertically in operational use with the rope robot being coupled to the object, and a manipulator unit comprising a manipulation motor coupled to and driving a shaft coupling, the manipulator unit configured for manipulating the object for mounting the object to the power line when within reach, wherein the object is configured for being coupled to the manipulator unit when the object is received by the support unit of the rope robot in operational use, the object being further provided with an attachment mechanism on an upper side of the object and being configured for being mounted to the power line by the manipulator unit, wherein the upper side is defined as the side of the object facing up when the at least two ropes are oriented substantially vertically in operational use with the rope robot being coupled to the object.

13. The object in accordance with claim 12, wherein the attachment mechanism comprises a rotatable arm, which is configured for hooking to the power line by rotation of the rotatable arm.

14. The object in accordance with claim 13, further comprising a locking mechanism comprising a locking arm for locking the rotatable arm after the rotatable arm has been hooked to the power line in operational use.

15. The object in accordance with claim 14, wherein the locking mechanism is driven by a mechanical mechanism comprising a rack rail, a gear, and a gear shaft, that is configured for being coupled to and driven by the manipulator unit of the rope robot in operational use.

16. The object in accordance with claim 12, wherein the object is selected from a group consisting of: a line sensor, an aviation marker, an aviation marker light and other equipment to be attached to the power line.

17. A method of removing the object in accordance with claim 12 from a power line, wherein the method comprises:
suspending and tensioning at least two ropes between the physical ground and the power line near or at the object;
coupling the rope robot, with the at least two ropes in such a way that the rope robot can climb up and down the at least two ropes in operational use;
making the rope robot climb up to the power line close to the object on the power line;
locking the object to the rope robot and releasing the object from the power line with the rope robot, and
making the rope robot climb down the at least two ropes.

18. The method in accordance with claim 17, wherein the object is selected from a group consisting of: a line sensor, an aviation marker, an aviation marker light and other equipment to be attached to the power line.

19. An assembly comprising a rope robot, the rope robot being configured for climbing along at least two ropes that are substantially vertically suspended and tensioned between a physical ground and a power line and for mounting an object to the power line, the rope robot comprising a rope robot housing; a crawler unit mounted on or in the rope robot housing for receiving and clamping onto the at least two ropes and for climbing up and down the at least two ropes in operational use, the crawler unit comprises at least two sets of wheels configured in such a way that one rope is clamped in between each pair of wheels, and wherein at least one of said wheels of each pair is driven by a rope climbing motor for driving the crawler unit; a support unit provided at an upper side of the rope robot housing of the rope robot, the support unit comprising a shaft coupling placed in the robot housing in such a way that the shaft coupling sticks out at an upper side of the rope robot, such that the support unit is configured for holding the object, wherein the upper side is defined as the side of the rope robot housing facing up when the at least two ropes are oriented substantially vertically in operational use with the rope robot being coupled to the object, and a manipulator unit comprising a manipulation motor coupled to and driving the shaft coupling, the manipulator unit configured for manipulating the object for mounting the object to the power line when within reach, and further comprising the object, wherein the object is being held by the support unit of the rope robot.

20. A rope robot being configured for climbing along at least two ropes that are substantially vertically suspended and tensioned between a physical ground and a power line of a power distribution network and for mounting an object to the power line, wherein the rope robot comprises:
a rope robot housing;
a crawler unit mounted on or in the rope robot housing for receiving and clamping onto the at least two ropes and for climbing up and down the at least two ropes in operational use;
a rope climbing motor coupled to crawler unit for driving the crawler unit;
a support unit provided at an upper side of the rope robot housing of the rope robot, the support unit being configured for holding the object, wherein the upper side is defined as the side of the rope robot housing facing up when the at least two ropes are oriented substantially vertically in operational use with the rope robot being coupled to the object, and
a manipulator unit configured for manipulating the object for mounting the object to the power line when within reach.

* * * * *